United States Patent [19]

Jordan et al.

[11] 3,928,316

[45] Dec. 23, 1975

[54] XANTHOMONAS GUM AMINE SALTS

[75] Inventors: Wesley A. Jordan, Denver, Colo.;
Walter H. Carter, Houston, Tex.

[73] Assignee: General Mills Chemicals, Inc.,
Minneapolis, Minn.

[22] Filed: Apr. 22, 1974

[21] Appl. No.: 462,897

[52] U.S. Cl.............. 260/209 R; 106/206; 252/152;
252/8.8
[51] Int. Cl.² .............................. C08B 9/00
[58] Field of Search ................... 260/209 R

[56] References Cited
UNITED STATES PATENTS

| | | | |
|---|---|---|---|
| 3,376,282 | 4/1968 | Schweiger | 260/209 R |
| 3,422,085 | 1/1969 | Gill et al. | 260/209 R |
| 3,632,570 | 1/1972 | Gill et al. | 260/209 R |

Primary Examiner—Johnnie R. Brown
Attorney, Agent, or Firm—Patrick J. Span; Gene O. Enockson; Elizabeth Tweedy

[57] ABSTRACT

Salts of xanthomonas gum and fatty amines useful as precursors of hydrated or dissolved thickening agents in alkaline media.

2 Claims, No Drawings

XANTHOMONAS GUM AMINE SALTS

This invention relates to salts of xanthomonas gum and fatty amines and a process for making the salts. More particularly, this invention relates to salts of xanthomonas gum or its water-soluble metal salts and fatty amines wherein the xanthomonas gum-amine salt has the formula:

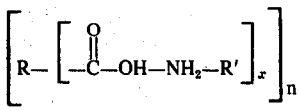

wherein R is the hexosic groups constituting the repeating monomer group in the xanthomonas gum, R' is an alkyl group having from 10 to 20 carbon atoms and can be either straight or branched, $x$ is the number of carboxylic-amine salt groups per repeating unit and is an integer of 3 to 4 producing a degree of substitution in the polymer between 3 and 4 and $n$ is an integer between about 300 and 1,000 representing the number of repeating monomer units in the polymer chain. By degree of substitution as used herein is meant the average number of carboxylic-amine groups per monomer unit in the polymer chain.

Xanthomonas gum is an anionic heteropolysaccharide produced by the fermentation of carbohydrate by the bacterium *Xanthomonas Campestris*. The structure is a polymer chain containing mannose, glucose and glucuronic acid groups. The carboxylic radicals of the glucuronic acid groups are available to react with an amine.

Amines useful in the practice of this invention are fatty amines having a chain length between 10 to 20 carbon atoms and include coco amine, N-coco-1,3-propylene diamine, tallow amine, N-tallow-1,3-propylene diamine, lauryl amine, palmityl amine, stearyl amine, oleyl amine and diamines of lauryl, myristyl, palmityl, stearyl, and oleyl. Preferably the amines are used in the form of water-soluble salts of inorganic acids like HCl or organic acids having about 1 to 3 carbon atoms. Such salts are more water-soluble than the fatty amines themselves.

The salts formed by the fatty amines and the xanthomonas gum are stable and water insoluble at pH levels of about 7 to 1 and more especially at pH levels of about 5 to 1. Best insolubilizing efficiency is obtained at pH levels of about 3.5 to 2.5. At pH's slightly above 7 the salts slowly dissociate into their component parts, namely the fatty amines and the polymer. Substantially complete dissociation at these pH levels requires about 72 hours. The rate of dissociation increases as the pH is increased up to about 10.5 to 11. At these pH levels, dissociation is quite rapid. At pH levels between about 7 and 1, the salts will swell in water. When the salt is dissociated in alkaline medium, the component polymeric portion will swell and hydrate in the same manner as the original gum. Hence the salts are precursors of hydrated or dissolved thickening agents in alkaline media. To the extent that the amine salts swell they are thickening agents in themselves at pH's between about 7 and 1. The salts also dissociate in strong acid media, i.e., at pH levels below about 1.

The carboxylic fatty amine salts of this invention are prepared by reacting a fatty amine or mixtures of fatty amines with the xanthomonas gum or its water-soluble metal salts in a slurry. The salt precipitates at pH's between about 7 and 1. The salt can be used either in wet or dried fiber form or the fibers can be dried and ground.

The above reaction which forms the salts of this invention also finds particular use in the recovery of xanthomonas gum from its fermentation broth. Xanthomonas gum is a fermentation product produced by the action of the bacteria *Xanthomonas Campestris* upon carbohydrates. Carbohydrates useful in the reaction include simple sugars, such as glucose and fructose, sucrose, starch and starch hydrolyzates. The reaction is carried out in the presence of selected minerals including phosphate and magnesium ions and a nitrogen source, usually a protein. The reaction is conducted in a pH range of from 6.5 to 7.5, preferably 7, and in a temperature range of from 28° to 30°C. In general, the commercial process involves growing the bacteria, inoculating a small batch of fermentable broth with the bacteria, allowing the small batch to ferment, inoculating a large batch of fermentable broth with the previously fermented small batch of broth, allowing the large batch to ferment, sterilizing the broth and finally recovering the xanthomonas gum from the broth.

The fermentation has been carried out by the following procedure. In the first step the bacteria was grown on an agar slant. In the second step bacteria from the slant was used to inoculate two liter aliquots of a fermentable broth containing per liter: sucrose, 20 grams; $Na_2HPO_4$, 8 grams; $NaH_2PO_4$, 1 gram; $MgSO_4 \cdot 7H_2O$, 0.25 gram; and 90 grams of cooked soy meal dispersion. The cooked soy meal dispersion was made by agitating at 180 rpm. 90 grams of soy meal in 600 ml. of water at a temperature of 90°C. for a period of 30 minutes and then centrifuging and discarding the residue. The above broth was allowed to ferment for a period of 31 hours at a temperature of about 28° to 30°C. In the third step the broth was used to inoculate a 15 liter batch containing the same broth composition. The broth of the third step was allowed to ferment for a period of 29 hours at a temperature of about 28° to 30°C. The broth from the third step was used to inoculate a 15,000 liter batch of broth having the composition per liter of broth of: sucrose, 20 grams; cooked soy meal dispersion, 6 grams; rapeseed oil, 0.65 gram; sulfuric acid, 0.53 gram; $MgSO_4 \cdot 7H_2O$, 0.25 gram; $Na_2HPO_4 \cdot 12H_2O$, 15 grams and tap water. The final batch was allowed to ferment for a period of about 72 hours at a temperature of about 28° to 30°C. At the end of the final fermentation period the broth was steam sterilized to destroy all the viable microorganisms. The pH of the broth was then adjusted to 7.9 by the addition of potassium hydroxide and the gum was recovered from the broth.

In the above fermentation procedure a phosphate ion is essential for the growth of the bacteria. The particular phosphate salts shown above also act as a buffer to help maintain the desired pH. Other phosphate salts can be used if appropriate steps are taken to control the pH. Different magnesium salts can be used. Xanthomonas gum contains glucuronic acid groups and when the gum is made as described above, one half to three fourths of these groups are neutralized with sodium ions and the remainder with potassium ions. When potassium salts rather than sodium salts are used in the preparation of the gum, this ratio is reversed. Other modifications such as using different nitrogen sources, different selection of potassium and sodium ions, and different acids can be made. In general, such modifications will be within ±5 percent of the above amounts of the critical ingredients. Once formed, the broth contains gum, residues of the chemicals, unconverted sugars and cell walls of the xanthomonas bacteria.

Heretofore the xanthomonas gum has been extracted from the broth by a variety of methods, one of which is precipitating the polymer with methyl alcohol and an electrolyte and removing the precipitate. Another method is to precipitate the polymer with an electrolyte and sec.-butyl alcohol. Another method is to precipitate the gum with isopropyl alcohol. Still another method is precipitating the polymer by adding hydrated lime to the broth which forms fibers and then removing the calcium ion as a salt by treating the fibers with acidified water soluble organic solvent. Still another method of removing the polymer from the broth is by precipitating the polymer with a salt of a polyvalent metal and adjusting the fermented broth to a pH of 8.5. The precipitate is washed with ammonium hydroxide and dried. The polymer has also been removed by precipitation with calcium hydroxide and treating the resultant fibers with methyl alcohol and hydrochloric acid solution to remove the calcium ion. Finally, the recovery of the polymer has been accomplished by precipitating with a fatty quaternary ammonium compound and removing the quaternary compound by washing the fibers with methanol.

We have discovered that the polymer formed by the fermentation by hexose sugars or polymers thereof by the bacterium *Xanthomonas Campestris* NRRL B–1459 can be removed from the fermented broth by adding a fatty amine to the broth at a pH preferably between about 5 and 1. The resultant water-insoluble fibers can be dried and ground to a powder or the fibers can be further processed by extraction with alkaline monohydric alcohols having 1 to 3 carbon atoms to separate the amine from the polymer thereby yielding a high grade xanthomonas gum. The alkaline monohydric alcohol can be methanol, ethanol, propanol or isopropanol containing a soluble alkaline material preferably alkali metal hydroxides in an amount of about 5 percent to 15 percent by weight. We have also found that the amine forming process can be used to remove impurities from spray dried xanthomonas gum by making a sol of the spray dried gum and reacting the hydrated gum with fatty amine adjusting the pH to between about 5 and 1 thereby separating the gum amine from the soluble non-gum matter. The gum amine can then be processed with alkaline monohydric alcohol to recover the purified gum.

The process of the present invention produces substantial economic advantages over the heretofore used procedures. For example, when the gum is extracted from the broth by precipitation with alcohol about two volumes of alcohol for each volume of broth are required. The standard process for separating alcohol from the waste liquor is by fractional distillation. When a polyvalent metal is used, the polymer has limited use since the polyvalent ion must be removed or liberated with a monovalent alkali based ion to make the precipitated gum soluble in alkaline or brackish water. The use of fatty quaternary ammonium compounds for precipitating the gum in fermented broth has its disadvantages as shown in the specific examples below.

The specific examples set out below further illustrate the properties of the salts of this invention and some of the ways in which they can be used.

EXAMPLE I

EXTRACTION OF XANTHOMONAS GUM FROM A SOL

To 2,500 g. of a 1 percent sol of xanthomonas gum were added 2,500 g. of tap water. The pH was adjusted to 4.5 to 5 with acetic acid. The mixture was thoroughly mixed with an air driven Lightnin' Mixer rotating at about 200 rpm. To the mixture, while being agitated, was slowly added a 1 percent solution of tallow amine acetate. (pH of the tallow amine acetate solution was 3.5.) Fibers appeared in the sol when about 150 g. of the amine acetate solution had been added. About 10 g. of the fluid was decanted from the sol into a test tube and tested for unreacted gum by adding about 10 ml. of 1 percent amine acetate solution. More fibers formed showing that not all the gum had been precipitated. The contents of the test tube was returned to the beaker containing the sol and fiber mixture and about 150 g. more of amine acetate solution was added and stirred into the mixture. Again the supernatant liquid was tested for unprecipitated gum. This process was repeated until a total of 1110 g. of 1 percent tallow amine acetate solution was added, at which time the supernatant liquid tested negative. The mixture was stirred about 10 minutes and the fibers were separated from the liquid by filtering through a 40 mesh screen. After washing with cold water the fibers were pressed to squeeze out as much water as possible and then dried at 35°–40°C. for 24 hours.

The above process was repeated 15 times using the same proportions and procedure as described. In the 17th run, the weight of the sol was increased to 3050 g. and the quantity of amine used was increased by 25 percent. In the 17 runs, 43,050 g. of 1 percent xanthomonas gum was subjected to the amine precipitation process and a total of 18,040 g. of 1 percent amine acetate solution was used. Since both the gum and amine solutions contained 1 percent active ingredients, the above figures show that the ratio of xanthomonas gum to tallow amine in the finished salt was 7 to 3 by weight.

The dried fibers from the 17 runs were mixed, ground and sifted through a 20 mesh screen.

EXAMPLE II

Comparison of Xanthomonas-Tallow Amine Salt and Xanthomonas Quaternary Ammonium Compound Salts and Xanthomonas Gum Alone The literature reports the use of a quaternary ammonium compound for precipitating *Xanthomonas Campestris* gum from broth. The quaternary ammonium compound was described as alkyl trimethyl ammonium chloride where the alkyl group is 90 percent hexadecyl. Such compounds were made by reacting methyl chloride with hexadecyl amine. A 1 percent sol of a quaternary ammonium compound in which the alkyl group was about 80 percent octadecyl was prepared.

Using the same procedure as outlined in Example I for extracting xanthomonas gum from a sol with tallow amine, we found that 11,900 g. of 1 percent tallow quaternary ammonium compound solution was required to extract the gum from 26,100 g. of a 1 percent sol of xanthomonas gum. The salt so formed was separated from the solution by filtering through a screen, and the wet fibers were collected, squeezed to remove as much water as possible and then dried in a forced draft oven at 35°–40°C. overnight. The dried fibers were ground and sifted through a 20 mesh screen.

The above quaternary salt, the amine salt made as described in Example I and xanthomonas gum alone were made up into cleaning formulations. While many formulations are used for washing off grease or fat from the walls of buildings where animal fat is processed, the common practice is to thicken a dilute aqueous solution of caustic soda (pH 11–13) and trisodium phosphate with a soluble polymer to impart viscosity and pseudoplasticity to the cleaning fluid. The fluids are thickened so that when applied by spraying, a thick layer will be deposited. The first property that a thickener must have is hydration capability in alkaline water.

The fatty amine salt of Example I was compared with a quaternary ammonium compound salt and regular xanthomonas gum for its ability to thicken water which had been adjusted to pH 12 with NaOH. Sols were made using the salts or gum according to the following procedure.

Three grams of gum or salt were added to 297 g. of alkaline water (pH 12) being agitated in a Waring Blender stirring at a speed to form a vortex extending one-half the distance between the liquid surface and impeller blades. After mixing 5 minutes the mixture was transferred to a 600 ml. beaker and placed in a water bath at 25°C. The viscosity of the mixture was measured at periods of 1 minute, 15 minutes, 60 minutes and 24 hours after the gum had been added to the solution, using a Brookfield RVF viscometer equipped with a No. 4 spindle rotating at 20 rpm. Solution temperatures were 25°C. ±2°

The following table shows the viscosity profile for each sol:

Table 1

| Sol Age | % Solids in Sol | Water (pH 12) Thickened With | | |
|---|---|---|---|---|
| | | Xanthomonas Gum | Quaternary Ammonium Salt | Amine Salt |
| 1 min. | 1% | 3600 cps | <10 cps | 2600 cps |
| 15 min. | 1% | 3700 cps | <10 cps | 3200 cps |
| 60 min. | 1% | 3800 cps | <10 cps | 3100 cps |
| 24 hrs. | 1% | 3900 cps | <10 cps | 2800 cps |
| pH of sols after 24 hrs. | | 11.5 | 11.4 | 10.3 |

It is obvious that the quaternary ammonium salt is insoluble in alkaline water and therefore has no utility in strong alkaline cleaning solutions.

After the xanthomonas gum sol and fatty amine salt sols had aged 24 hours, an aliquot of both were diluted to 0.5 percent solids and their gel strengths were measured by the API procedure. (Fann, No. 1 spring, 3 rpm). The xanthomonas gum sol gave a gel strength of 17 lbs./100 sq. ft. and the amine complex gave 16 lbs./100 sq. ft.

The remaining portion of the 1 percent fatty amine salt sol shown in the above table was adjusted to pH 12 with 10 percent NaOH solution. This changed the viscosity of this sol to 3400 cps, showing that its viscosity is sensitive to pH change. To 50 g. of this sol was added 1 g. of trisodium phosphate. The sol was poured onto a glass plate (5 × 7 inches) covered with a film of bacon grease, and the plate was set on end in a vertical position. The sol remained on the plate and did not run off. After 15 minutes of contact with the greasy plate, the sol was washed off with a stream from a laboratory squeeze bottle. The water temperature was 77°F. A clean surface resulted, indicating that the fatty amine salt did not interfere with the cleansing action of the trisodium phosphate and alkali solution and the gelling properties of the salt were sufficient to prevent run off.

EXAMPLE III

Comparison of Wet Fibers and Dry Powder

The fatty amine salt can be used in two forms. One is as a dry powder and the other is as a wet fibrous product containing about 45–55 percent water. The dry powder is produced by drying and grinding the wet fibers. The complex requires alkali to dissociate it. We found that the alkali can be added to the wet fibers as potassium or sodium carbonate and which can then be dried and ground. This eliminates the need for adjusting make-up water to a pH of 10–12 prior to adding the salt.

There are some advantages of using wet fibers in preference to dried and ground fibers. The wet fibers swell faster in 20 percent HCl, 25 percent NaCl, alkaline 5 percent NaCl solution, 5 percent NaOH and 60 percent ammonium nitrate solutions. Data comparing wet fibers having the composition 35% Xanthomonas Campestris gum
15% tallow amine
50% water
100% and dry and ground fibers having the composition

63% Xanthomonas Campestris gum
27% tallow amine
10% moisture
100% dissolved in the following solutions: 20 percent HCl, 25 percent NaCl, 5 percent NaCl (ph 11.5), 5 percent NaOH, 60 percent $NH_4NO_3$ are shown in Table 2. Two sols were made from each solution. One sol was made by adding wet fibers, the other by adding dried and ground fibers. The sols using wet fibers were prepared as follows: Wet fibers in the amount of 1.4 g. (which contain 3.99 grams of xanthomonas gum) were dispersed in the solution. Agitation was continued for 5 minutes and the contents were then poured into a 600 ml. beaker and placed in a water bath having a temperature of 25°C. for 24 hours.

Preparation of sols using dry and ground fibers was as follows:

Three hundred ninety-six grams of solution was weighed into a Waring Blendor cup. It was agitated at slow speed. To the solution was added 6.41 g. of dry fibers. The dry fibers contained 4.03 g. of *Xanthomonas Campestris* gum. After agitating for a period of 5 minutes, the dispersion was transferred to a 600 ml. beaker and the beaker was set in a water bath having a temperature of 25°C. for 24 hours.

After 24 hours the viscosity of all sols was measured using a Brookfield LVT viscometer No. 4 spindle rotating at 20 rpm. The four sols made in NaCl solution and the two made in $NH_4NO_3$ solution were sheared at 8000 rpm. and 1 hour later their viscosities were again measured using the same equipment.

The following table compares the viscosities of the aged sols made from wet and dry fibers, before and after shearing.

| Solution Used | Viscosity of 1% Gum Sols Aged 24 Hours and Made From | |
|---|---|---|
| | Wet Fibers | Dry And Ground Fibers |
| 5% NaCl (pH 11.5) | 6200 cps | <10 cps |
| After Shearing | 6200 cps | 3100 cps |
| 25% NaCl (pH 6.8) | 300 cps | 10 cps |
| After Shearing | 5400 cps | 500 cps |
| 60% $NH_4NO_3$ | 200 cps | <10 cps |
| After Shearing | 5800 cps | 600 cps |
| 20% HCl | 2300 cps | <10 cps |
| 5% NaOH | 4700 cps | 100 cps |

The above data indicate that the wet fibers have better hydrating capability than the dry fibers in the solutions listed.

EXAMPLE IV

Extraction of Xanthomonas Gum from Broth

To 200 g. of broth was added 400 g. of water. The mixture was stirred about 5 minutes. The viscosity of the broth before dilution was 3900 cps (Brookfield LVT No. 4 spindle, 30 rpm., 25°C.). The viscosity after dilution was 370 cps (Brookfield LVT No. 2 spindle, 30 rpm., 25°C.). The pH of diluted broth was 6.9.

To the diluted broth was added sufficient 10 percent HCl solution to adjust the pH of the sol to 3.4.

The mixture was agitated with an air driven Lightnin' Mixer and while it was agitated, 274 g. of a 1 percent tallow amine acetate solution was slowly added. The 1 percent tallow amine acetate solution contained sufficient acetic acid to produce a pH of 3.4 in the solution.

Strong firm fibers formed which floated to the surface of the broth. The fibers were separated from the liquor by straining through a 40 mesh sieve, and were washed on the wire by running cold tap water over them.

The wet fibers were transferred to a 6 inch evaporating dish and 200 g. of isopropyl alcohol was added. The evaporating dish was placed on a steam cone and the fibers and alcohol were heated to about 70° to 75°C. Most of the fibers dissolved and those that did not completely dissolve were soft and slimey. Heating was continued about 10 minutes.

To the dissolved fibers was added 7 g. of 5 percent alcoholic KOH. Fibers again formed. The fibers were separated by pouring the contents onto a 40 mesh screen. The fibers were washed with 50 g. of alcohol to which 4 g. of 5 percent alcoholic KOH had been added. Again the fibers were separated from the liquor by pouring the liquor and fibers onto a sieve. The wet fibers were dried in air at room temperature overnight. The weight of the fibers was 2.7 g.

The dried fibers (2.7 g.) were added to 270.3 g. of distilled water. The mixture was stirred mildly for 10 minutes with a Sargent Cone stirrer rotating at 500 rpm. and then stirred 2 minutes at 4000 rpm. with an Eppenbach. The sol was cooled to 25°C. and the viscosity was determined, 2000 cps, Brookfield LVT No. 4 spindle, 30 rpm., 6.9 pH.

A film was applied on a glass plate and dried. The film appeared to be slightly opaque. A drop of water was put on the dried film and wiped off immediately. The film dissolved in one second. This speed of dissolving indicates that the gum would be suitable for textile print paste thickener.

The percent of gum in the original broth was determined by the standard alcohol precipitation procedure. It contained 3.35 percent xanthomonas gum. Since 3.4 percent gum was recovered, the total recovery can be considered as 100 percent recovery of gum plus 0.05 percent recovery of amine as salt of the gum.

EXAMPLE V

Purifying Spray Dried Xanthomonas Gum

Spray dried xanthomonas gum contains about 66 percent of active gum and about 33 percent of non-gum residue. The non-gum residue contains cell bodies, protein and inorganic salts. The non-gum fraction can be separated from the xanthomonas gum by first making a sol of the spray dried product followed by extracting the gum by precipitation with a fatty amine. The extracted gum-amine salt can then be further treated to separate the gum from the amine. The resulting gum is high quality xanthomonas gum.

A sol of the spray dried xanthomonas gum was made by dispersing 5 g. of gum in 495 g. of water. The mixture was stirred for about 2 minutes and then allowed to stand. After 24 hours the sol developed 1250 cps viscosity (Brookfield RVF No. 4 spindle, 20 rpm., 25°C.).

To the sol was added 1000 g. of water. The mixture was stirred for about 20 minutes at which time 375 g. of a 1 percent solution of tallow amine acetate was slowly added. The pH of the mixture was 5.6. Fibers formed which were separated from the liquor by straining through a 60 mesh screen.

The wet fibers were transferred to an evaporating dish and to the wet fibers was added 200 g. of isopropyl alcohol. The mixture was heated to 60°C. and the fibers dissolved, forming a thick viscous paste. To the paste was added 15 g. of 5 percent KOH in isopropyl alcohol solution. Fibers again formed. The fibers were collected by straining the liquor through a 60 mesh screen. The fibers were washed with 100 g. of isopropyl alcohol and again removed by straining through a screen. The wet fibers were dried at 143°F. for 1 hour. Weight of dried fibers was 3.2 g., which is 64 percent of the starting gum.

Two grams of the fibers were dispersed in 198 g. of distilled water. After 5 minutes, the viscosity of the sol was 2,900 cps and after 90 minutes its viscosity was 3,400 cps and after 24 hours its viscosity was 3,500 cps (Brookfield RVF No. 4 spindle, 20 rpm., 25°C.).

The embodiments of the invention in which an exclusive property or privilege is claimed are defined as follows:

1. A salt of xanthomonas gum and a fatty amine containing from 10 to 20 carbon atoms, said salt having the formula:

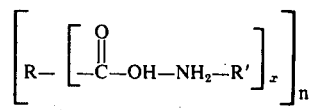

wherein R is the hexosic groups constituting the repeating monomer group in the xanthomonas gum polymer chain, R' is an alkyl group containing from 10 to 20 carbon atoms, x is the number of carboxylic-amine salt groups per repeating monomer group and is an integer of 3 to 4, n is a number between 300 and 1,000 and the degree of substitution of said carboxylicamine salt groups in the polymer is between 3 and 4.

2. The salt of claim 1 wherein R' contains 18 carbon atoms.

* * * * *

UNITED STATES PATENT AND TRADEMARK OFFICE
CERTIFICATE OF CORRECTION

PATENT NO. : 3,928,316
DATED : December 23, 1975
INVENTOR(S) : Wesley A. Jordan & Walter H. Carter It is certified that error appears in the above-identified patent and that said Letters Patent are hereby corrected as shown below:

Column 1, lines 10-14, delete

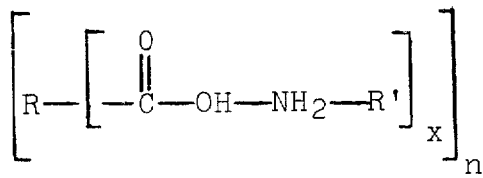

and insert

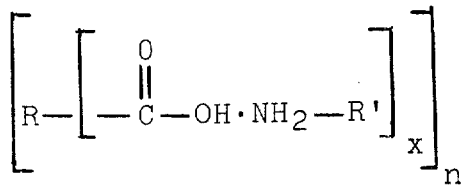

Column 8, lines 64-67, delete

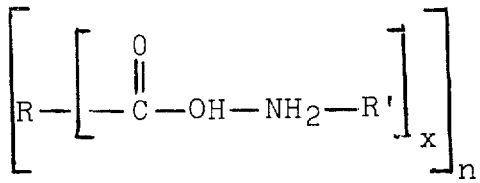

and insert

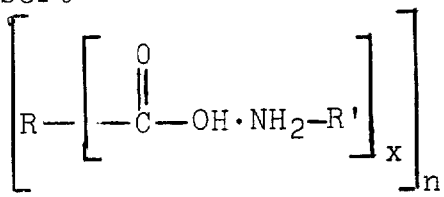

Signed and Sealed this twenty-seventh Day of April 1976

[SEAL]

Attest:

RUTH C. MASON
Attesting Officer

C. MARSHALL DANN
Commissioner of Patents and Trademarks